United States Patent [19]

Hofmann et al.

[11] Patent Number: 5,176,457
[45] Date of Patent: Jan. 5, 1993

[54] ANCHORING A DOUBLE ROW ANGULAR ANTI-FRICTION BEARINGS

[75] Inventors: Heinrich Hofmann, Schweinfurt; Manfred Tröster, Bad Kissingen, both of Fed. Rep. of Germany

[73] Assignee: Fag Kugelfischer Georg Schafer KGAA, Fed. Rep. of Germany

[21] Appl. No.: 778,260

[22] Filed: Oct. 17, 1991

[30] Foreign Application Priority Data

Oct. 17, 1990 [DE] Fed. Rep. of Germany ....... 4032953

[51] Int. Cl.⁵ .............................................. F16C 19/18
[52] U.S. Cl. .................................. 384/537; 384/512; 384/585
[58] Field of Search ............... 384/537, 512, 585, 502, 384/903, 510

[56] References Cited

U.S. PATENT DOCUMENTS

2,779,641 1/1957 Sutowski ............................. 384/502
5,066,147 11/1991 Brandenstein et al. ............. 384/537

FOREIGN PATENT DOCUMENTS

0328496 8/1989 European Pat. Off. .
965671 6/1957 Fed. Rep. of Germany .
3825326 1/1990 Fed. Rep. of Germany .
2004954 11/1979 United Kingdom .

Primary Examiner—Lenard A. Footland
Attorney, Agent, or Firm—Ostrolenk, Faber, Gerb & Soffen

[57] ABSTRACT

To achieve a dependable axial fastening of a flat cylindrical outer surface of the outer ring of a double row angular anti-friction bearing inside the smooth internal surface of the bore of the external housing in which the outer ring is disposed, the races for the bearing rolling elements, and which are either balls or tapered rollers, are oriented so that the resultant lines of bearing force extend from the rolling elements, converge and intersect the outer surface of the outer ring. The resultant lines of force converge at or radially outward of the outer surface of the outer ring. A respective pair of interruptions, in the form of annular grooves around the outer surface of the outer ring, and having sharp transition edges with the outer surface of the outer ring, are defined at both axial sides of and near to the intersection of a resultant line of force with the outer surface of the outer ring. Where the lines of force are near each other where they intersect the outer surface of the outer ring, one pair of interruptions are provided for both resultant lines of force. Each pair of interruptions near to and alongside one of the resultant lines of force or a single pair of interruptions near to and straddling both lines of force between them define a cylindrical section of the outer surface of the outer ring, which the resultant lines of force intersect.

11 Claims, 2 Drawing Sheets

ANCHORING A DOUBLE ROW ANGULAR ANTI-FRICTION BEARINGS

BACKGROUND OF THE INVENTION

The present invention refers to a double row angular anti-friction bearing including means for anchoring the bearing axially in a surrounding housing.

Simple but secure, click free, axial attachments of double row angular anti-friction bearings, which can also transmit high axial loads, are constantly sought. Particularly in the case of wheel mounts of motor vehicles, where great demands are made as to simple assembly and low weight, there is need for better solutions.

These goals are already achieved to a certain extent by embodiments like those shown in U.S. Pat. No. 2,779,641 and in Federal Republic of Germany Pat. 29 05 683. In these embodiments, no additional parts are necessary, since ring surface interruptions are arranged on the outer surface of the outer ring of the bearing. This produces projections in the general form of teeth. Upon installation of the outer ring into the surrounding housing around the bearing, the teeth grip into the interior surface of the housing with a high force fit, which is customarily present, resulting in a force locked and form locked attachment by simple means. However, these embodiments are complicated, since a large number of teeth must be provided, and these are expensive to produce. Since the teeth extend radially outward beyond the middle outer surface, disassembly is hardly possible.

The same comments apply also to Federal Republic of Germany application OS 32 16 958. Although the teeth there do not extend beyond the outer surface of the outer ring, a mating surface of a relatively soft material and a tight force fit must instead be present.

SUMMARY OF THE INVENTION

The object of the present invention is to provide double row angular anti-friction bearings in which a secure click free attachment is obtained with very simple means.

To achieve a dependable axial fastening of a flat cylindrical outer surface of the outer ring of a double row angular anti-friction bearing inside the smooth internal surface of the bore of the external housing in which the outer ring is disposed, the races for the bearing rolling elements, which are either balls or tapered rollers, are oriented so that the resultant lines of bearing force extend from the rolling elements, and converge and intersect the outer surface of the outer ring. The resultant lines of force converge at or radially outward of the outer surface of the outer ring.

A respective pair of interruptions, in the form of annular grooves around the outer surface of the outer ring, and having sharp transition edges with the outer surface of the outer ring, are defined at both axial sides of and near to the intersection of a resultant line of force with the outer surface of the outer ring. Where the lines of force are near each other where they intersect the outer surface of the outer ring, one pair of interruptions are provided for both resultant lines of force. Each pair of interruptions near to and alongside one of the resultant lines of force or a single pair of interruptions near to and straddling both lines of force between them define a cylindrical section of the outer surface of the outer ring, which the resultant lines of force intersect.

It is important in the invention to obtain a very good axial attachment of the single piece outer ring of a double row angular anti-friction bearing in the surrounding housing, with as few interruptions in the surface of the bearing outer ring as possible. This is obtainable if at least one relatively narrow axial width cylindrical section of the outer ring, which is limited on both axial sides by an interruption in the form of a groove in the outer surface of the outer ring, is arranged in the axial region of and near to the places where the resultant force lines of both rows of bearing elements of that bearing intersect or pass through the outer surface of the outer ring. The force lines are imaginary lines which connect the points of contact of the bearing ball in the ring races and also pass through the center of the ball. With a roller bearing, the force line is also through the center of the roller. In the axial regions of the bearing at the force lines, the stresses are particularly high, both as a result of the outer ring, which is installed with a force fit in the housing, and because of the external loads which are applied to the bearing. This is caused by the facts that the thickness of the outer ring is greatest at this point and because external forces must be withstood, particularly in the directions of the force lines.

The force lines of the two rows of bearing elements meet at or radially outside the outer surface of the outer ring. Where the lines meet at the outer surface, one set of interruptions in the outer surface straddles both force lines. Where the force lines meet outside the outer ring, a respective set of interruptions are at both axial sides of each force line.

A favorable axial position for the cylindrical section between two interruptions results if the interruptions are arranged in each case alongside the places of passage of each force line through the outer surface of the outer ring.

In these cases, a few interruptions are sufficient in order to effect good attachment of the outer ring in the housing. The cylindrical sections are in the region where the greatest stresses occur at the outer surface of the outer ring and the surrounding housing. The interruptions are shaped so that the axial or side edges of the grooves dig slightly into the housing interior. This produces a form locked axial attachment. This effect is particularly favored if the interruptions are annular grooves with sharp-edged transitions to the cylindrical outer surface of the outer ring.

It is obvious that in such an embodiment, production of the outer ring by, for instance, centerless grinding is very simple. With a small number of easily produced interruptions, and particularly annular grooves, form locked and thus secure attachments in the axial direction between the outer ring and the housing are obtained. The connection is so good that even microscopic movements are prevented. As a result, the desired freedom from click noises is obtained.

Other objects and features of the invention are explained with reference to the accompanying drawings.

DESCRIPTION OF THE PREFERRED EMBODIMENTS

Figure 1:
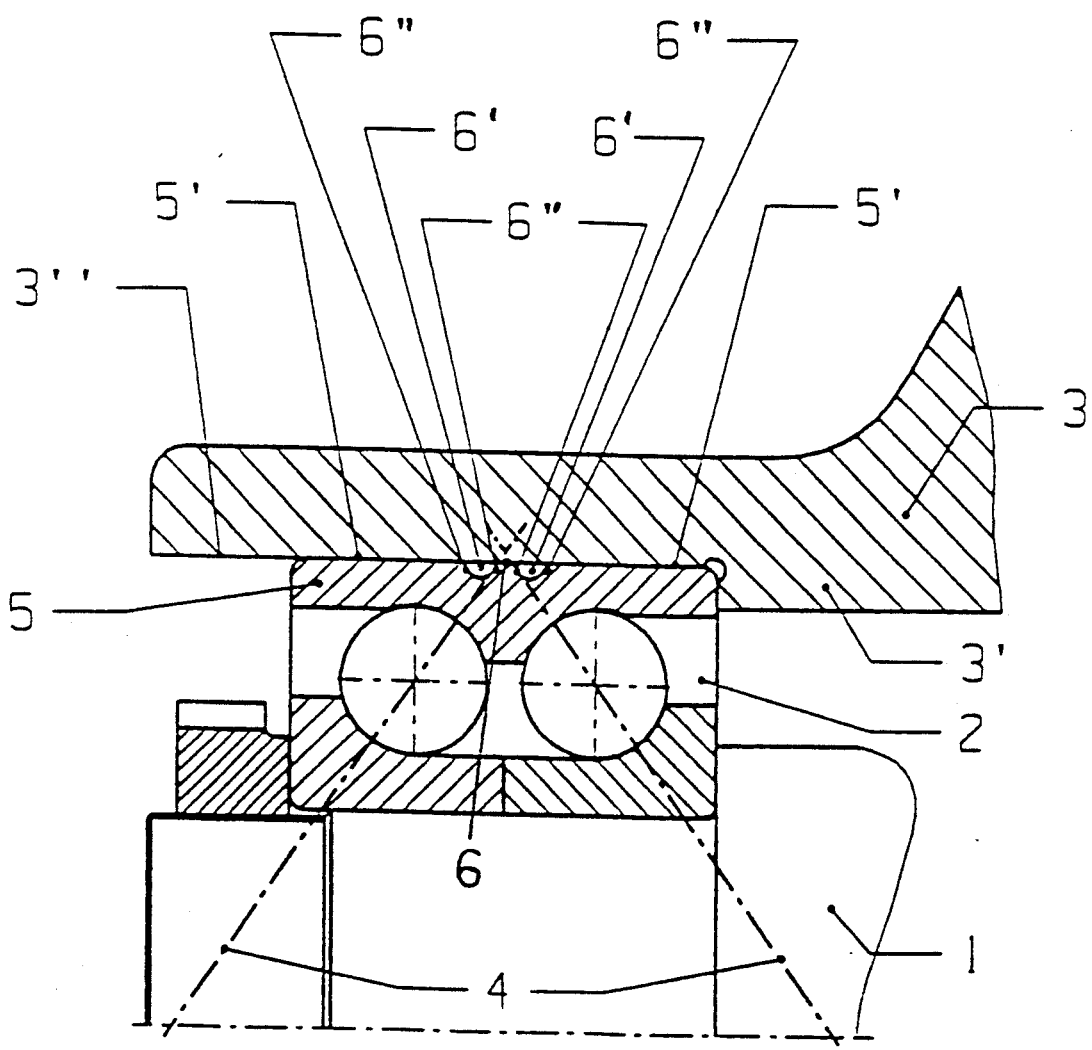
FIG. 1 is a partial axial section through a double row angular ball bearing according to the invention.

FIG. 1 shows the wheel mount of an automotive vehicle. A double row angular ball bearing 2 is seated on a stub shaft 1. The bearing has an inner ring with bearing element races. The inner ring is supported by the shaft 1. The bearing has an outer ring 5 outside the inner ring with bearing element races. There are two axially spaced annular rows of bearing element balls between respective cooperating inner ring races and outer ring races. The bearing outer ring 5 in turn is fastened in an axle support housing 3. The housing 3 has a shoulder 3' against which the bearing is axially installed. For reasons of mounting the bearing and simplification of bearing housing manufacture and assembly of the bearing in the housing, only a smooth interior surface 3" of the housing 3 has been shown in the direction away from the shoulder 3', so that axial fixing of the bearing 2 in the housing is necessary in the direction away from the shoulder.

The ring races are so shaped and oriented, with reference to the bearing elements or balls, that the various force lines in the two row bearing have a resultant force line 4 for each row of the bearing which in this case is so directed that, if one also includes the lower half which has not been shown in the drawing, an 0 approximately results. With this 0 arrangement, the force lines 4 pass through the axially central region of the outer surface 5' of the outer ring 5. Just to the axial sides of the axial center, quite near to where the force lines 4 intersect the outer surface, there are two interruptions 6' in the form of annular grooves around the outer surface, which form a narrow axial width cylindrical section 6 between the grooves. Those grooves have sharp edged transitions to the outer surface of the outer ring. Since the outer ring 5 is arranged with a force fit in the housing 3 and the forces in the angular ball bearing are transmitted approximately along the directions of the force lines 4, the normally hardened outer ring 5 will, particularly in the region of the axial edges 6" of the interruptions 6', dig into the interior bore surface 3" of the ordinarily softer housing 3. This produces an axial connection, which is also form locked, between the outer ring 5 and the housing 3 by simple means. In this case, the smooth surfaced remainder of the cylindrical outer surface 5' of the outer ring 5 serves as a centering section. Since a force fit is also present here, it serves as an additional force locked connecting section.

Figure 2:
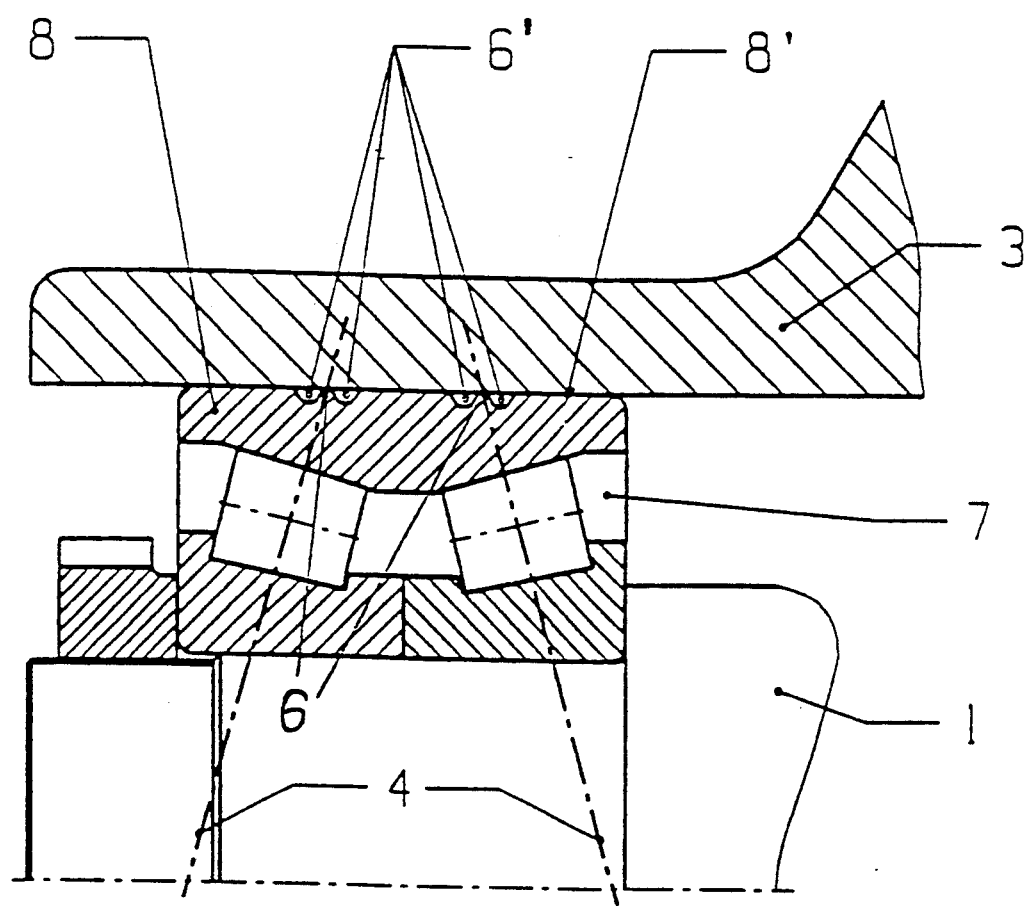
FIG. 2 shows a variant of FIG. 1 with a doublerow tapered roller bearing.

FIG. 2 shows a construction similar to that shown in FIG. 1, so that some of the reference numbers are identical. Instead of the angular ball bearing, a double row tapered roller bearing 7 in 0 arrangement is provided. The rollers of the bearing are so tilted and so spaced apart that the force lines 4 converge and meet radially outside the outer ring 8 and the housing 3. In this case, there are two annular groove interruptions 6 arranged in the outer surface 8' of the outer ring 8 quite near to and on opposite axial sides of the region where each of the resultant force lines 4 extends through the outer surface of the outer ring 8. These interruptions or grooves provide more axial edges at their transitions to the outer surface of the outer ring to bite into the interior bore surface of the housing 3 and provide two narrow axial width regions each between the two grooves of each set of interruptions. In the case of greater axial load, of course, several interruptions can be provided between the places of passage of the pressure lines.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A double row angular anti-friction bearing comprising:

a bearing inner ring and means supporting the inner ring; a bearing outer ring outside the inner ring, the outer ring having an outer surface that is cylindrical; two axially spaced apart annular rows of bearing rolling elements disposed between the inner and the outer rings; the inner and the outer rings having races for supporting the rolling elements;

a housing around the outer ring, the housing having an interior surface which is force fit over the outer surface of the outer ring;

the ring races being so shaped and the rolling elements being so shaped and positioned on the races that the resultant line of force through each rolling element of the rows of rolling elements is directed so that the lines of force from the two rows of bearing elements converge and meet radially outward of the bearing rolling elements and intersect the outer surface of the outer ring;

a pair of interruptions being defined in the outer surface of the outer ring at each axial side of and near to an intersection of a line of force with the outer surface of the outer ring for defining between each such pair of interruptions a narrow axial cylindrical section of the outer ring.

2. The bearing of claim 1, wherein each of the interruptions is circumferential around the outer surface of the outer ring.

3. The bearing of claim 2, wherein each of the interruptions comprises a respective annular groove defined in the outer surface of the outer ring.

4. The bearing of claim 1, wherein the interruptions are annular grooves having sharp edges at the outer surface of the outer ring which are adapted to firmly engage the interior surface of the housing of the bearing.

5. The bearing of claim 1, wherein the outer ring is a single piece.

6. The bearing of claim 1, wherein the rolling elements are axially so spaced and the bearing ring races are so shaped that the resultant lines of force intersect radially outward of the outer surface of the outer ring, so that the resultant force lines intersect the outer surface of the outer ring at axially spaced apart locations.

7. The bearing of claim 6, wherein there is a respective pair of the interruptions with a respective cylindrical section of the outer surface of the outer ring between the pair of interruptions in the outer surface of the outer ring and the interruptions of each pair being arranged at each axial side of each intersection of a resultant force line with the outer surface of the outer ring.

8. The bearing of claim 7, wherein the bearing elements are axially so spaced and the bearing ring races are so shaped that the resultant lines of force from the bearing elements intersect the outer surface of the outer ring at axially spaced apart locations along the outer surface: the outer ring being provided with a respective set of interruptions arranged axially at both sides of the intersection of each of the lines of force with the outer surface of the outer ring and;

the respective cylindrical section of the outer ring being defined between the respective interruptions at the intersection of each of the resultant lines of force with the outer surface, so that the resultant lines of force extend through the respective cylindrical sections.

9. The bearing of claim 1, wherein the interior surface of the housing is a smooth surface and the outer surface of the outer ring is also a smooth surface interrupted by the interruptions.

10. The bearing of claim 1, wherein the bearing is an angular ball bearing and the rolling elements are in the form of balls and the races of the inner and the outer rings are shaped and positioned on the balls to define the intersecting resultant lines of force of the rows of balls.

11. The bearing of claim 1, wherein the bearing is a double row tapered roller bearing and the rolling elements in each of the rows thereof comprise tapered rollers; the inner and outer ring races are oriented so as to orient the tapered rollers that the resultant line of force through each of the tapered rollers is a line of force that intersects the outer surface of the outer ring at the respective regions where the interruptions are located.

* * * * *